July 4, 1961

L. PÉRAS 2,990,849

NON-RETURN VALVE

Filed Jan. 29, 1957

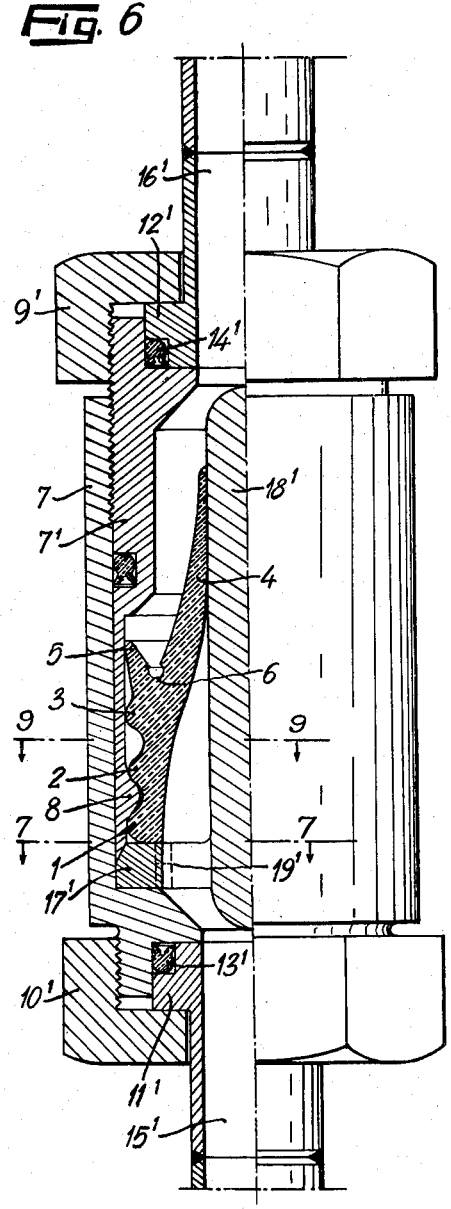

United States Patent Office 2,990,849
Patented July 4, 1961

2,990,849
NON-RETURN VALVE
Lucien Péras, Billancourt, France, assignor to Regie Nationale des Usines Renault, Billancourt, France
Filed Jan. 29, 1957, Ser. No. 636,950
Claims priority, application France Feb. 1, 1956
4 Claims. (Cl. 137—515.7)

The invention relates to non-return valves, and is concerned with improvements in said valves for guaranteeing that they operate satisfactorily, noiselessly and without excessive wear.

It is known to use non-return valves in fluid distributing systems, their function being to allow the free passage of the fluid in one direction and to prevent any flow in the opposite direction. They comprise essentially a body with tubular pieces for connecting to a piping system, an orifice for the passage of the fluid, provided with a seat, and a valve member. The valve member may be a flap, a disc, a ball, etc., restable on the seat in such a way as to ensure a fluid-tight joint under the action of its own weight or because of a metallic spring which holds it bearing against the seat.

These valves are given the most varied forms, depending upon the nature of the fluid, whether their position is horizontal, vertical or oblique, their method of use, etc., but the principle of their construction remains that which has just been defined.

Now the use of these valves sometimes results in serious disadvantages.

The metallic valve members generally smack against the seat, and eventually they wear down, thus causing leaks. The throughflow of the fluid is opposed by the valve member itself, which breaks up the flow, only allowing it a narrow annular passage. The rate of flow is irregular, and effective operation often depends on a spring which rusts or fatigues with wear, thus providing only precarious security.

The improvements according to the invention make it possible to eliminate these disadvantages and to provide valves which are silent, efficient, and are durable and regular in operation, eliminating all mechanical pieces, springs, balls, etc. The improvements consist in providing a flexible packing made of rubber or plastic material, comprising a circular double-torus base and an annular lip or rim which constitutes the valve member proper. This packing is inserted inside a valve body, the lip bearing against a seat of frusto-conical form having a concave profile.

In the outlet direction, the fluid passes through a series of apertures formed in the seat, and lifts the rim or lips, which open up the passage completely; in the opposite direction, the lip bears against its seat and completely prevents any throughflow.

In a modified form of the embodiment of the valve member, the latter comprises two sealing lips one of which bears against a central cylindrical smooth seat which is not formed with air passage grooves, while these grooves are distributed over the rubber body of the valve member, the second lip is articulated to the first lip and bears against the metal valve body.

Finally, the invention relates to another modified form of embodiment, which resides principally in a modification in the seat of the valve, making it possible to allow the fluid a free passage in the normally permissible direction, with a controlled and pre-determined passage in the other direction.

This variant consists essentially in providing a valve seat whose generally shape is cylindrical and which is formed with an axial duct which terminates at the outlet side of the valve in a calibrated orifice through which the fluid flows out until the pressure at the inlet side exceeds a value which does not allow sufficient flow of the fluid through the orifice, the lip of the valve member then moves away from the seat in order to allow the excess fluid to pass to the outlet side.

This variant also has as one of its objects the application of valves of this type to liquid shock-absorbers for vehicles, consisting in using two valves of this type with each shock-absorber. The outlets of the two valves are connected respectively to the two ends of the shock-absorber cylinder, and the inlets are connected to a liquid reservoir surmounted by a volume of air which is separated from the liquid by an elastic diaphragm.

A valve provided with the improvements according to the invention is illustrated by way of example in the accompanying drawings:

FIGURE 6 is a longitudinal sectional view of the valve and packing assembly according to a modified form of embodiment;

FIGURE 7 is a sectional view taken on line 7—7 of FIGURE 6;

FIGURE 8 is a sectional view of the packing of FIGURE 6 before assembly, showing the positions in which the two lips are vulcanised;

FIGURE 9 is a sectional view of the same packing taken on line 9—9 of FIGURE 6;

Figure 1:
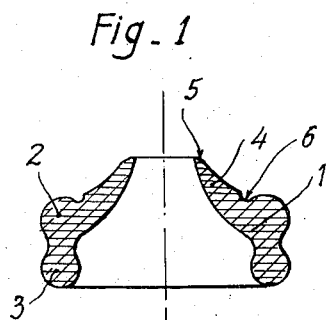
FIGURE 1 is a longitudinal sectional view of the packing according to the invention.
Figure 2:
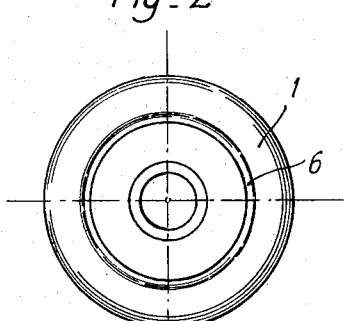
FIGURE 2 is a plan view from above of the packing according to FIGURE 1.

Referring more particularly to FIGURES 1 and 2, it will be seen that the packing comprises a base constituted by two semi-toric beads 2 and 3 and a rim or lip 4 terminating in a bevelled marginal portion 5. A circular groove 6 at the region where the lip joins the base gives the lip its full mobility.

Figure 3:
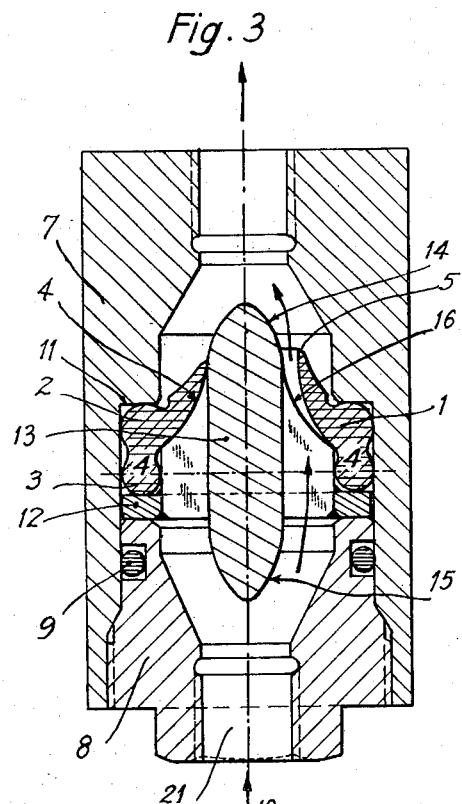
FIGURE 3 is a vertical sectional view through the axis of a non-return valve assembly constructed according to the invention, the left-hand part of the figure showing the valve closed and the right-hand part showing the valve opened.

FIGURE 3 shows by way of example, in a vertical sectional view, the general aspect of a non-return valve constructed according to the invention. Two parts 7, 8 of the valve body, are assembled together by screwing, for example, fluid-tightness at the joint being ensured by a toric ring 9 of current type. The packing 6 illustrated in FIGURE 1 is held in the valve body in a widened portion 11 of the part 7. The widened portion is limited below by the collar 12 of a seat 13. The collar 12 is held in position by the connector 8 screwed into the part 7. The valve seat 13 comprises a cylindrical core terminating at its two ends in the ovoid portions 14 and 15, and the valve seat proper 16 which has a concave frusto-conical profile against which the marginal portion of the lip 4 bears in the closure position of the valve, as illustrated in the left-hand part of FIGURE 3.

Figure 5:
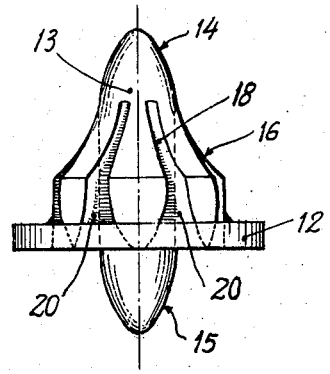
FIGURE 5 is an elevational view of the valve seat shown in section in FIGURE 4.
Figure 4:
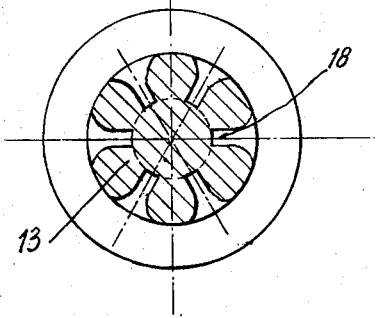
FIGURE 4 is a sectional view taken on line 4—4 of FIGURE 3 of the valve seat of the valve shown in FIGURE 3.

The apertures 18 in the seat allow the fluid to pass through in the direction of the arrow 19. It will be noted (FIGURE 5) that these apertures have flared portions 20 at the inlet side, which, in combination with the ovoid shapes 14, 15 of the core, reduce the loss of pressure at the valve to a minimum and thus promote the through-flow of the fluid even under very low pressure.

The manner in which the valve operates will be apparent from the preceding description:

When a fluid pressure becomes established at the inlet 21 of the valve body, the lip 4 of a packing 1 is lifted and the fluid passes freely through the apertures 18. This lifting of the lip 4 is shown in the right-hand part of FIGURE 3.

When the pressure drops, the elastic tension of the packing returns the lip against its seat and closes the valve. Any flow of the fluid in the opposite direction is thus prevented, as is illustrated in the left-hand part of FIGURE 3.

Nor is any leakage possible between the valve body and the packing due to the double seal effected by the two toric beads forming the base of the said packing.

It should be noted that the fluid-tightness of the valve is provided not only by the closing of the apertures 18, which are covered by the lip 4, but more especially by the remarkably accurate contact of the marginal portion 5 of the lip against the cylindrical core 13.

Referring more particularly to FIGURES 6 and 8, it will be seen that the packing is composed of a base formed by three semi-toric beads 1, 2 and 3 and comprises at its upper portion two lips which terminate in a bevelled or tapered marginal surface, a large internal lip 4 and a small external lip 5, the two lips being articulated by one another by the circular groove 6, which enables them to be movable relatively to one another and relatively to the base of the packing. An appropriate number of grooves O are formed in the packing.

The packing is held in the valve body 7—7' by a bead 8 on the said body. The bead fits between the two beads 1 and 2 on the packing. A free space has been left between the beads 2 and 3 in order to avoid a reaction of the metallic bead 8 on the lip 5 when the latter is compressed in its longitudinal direction. Sleeves 11' and 12', constituting respectively the inlet and outlet ends of the valve, are fixed to the body 7 by means of nuts 9' and 10'. Packing rings 13' and 14' ensure fluid-tightness between the sleeves and the body 7. The base of the packing bears against a small plate 17' which is arranged inside the body 7' and is illustrated in a sectional view in FIGURE 7. In this small plate are formed orifices 19' for the passage of air. This small plate is formed with several orifices which must of course correspond to the corresponding grooves O in the valve member. In order to prevent errors in positioning this small plate during assembly, the said small plate can also be provided with a large number of smaller-diameter orifices so that, whatever the position of the plate, a sufficient number of orifices will always be situated opposite the grooves in the valve member. When the packing is arranged in the body 7' the lip 4 bears against a preferably cylindrical central piece 18' which is arranged axially of the body 7 and is fast with the body. The piece 18' constitutes, in a manner of speaking, the valve seat. The lip 5 bears against the valve body 7'. The lips 4 and 5 are made to bear against their supporting surfaces by their own elastic tension.

It should also be noted that the tapering shape of the large internal lip allows the lip to withstand considerable pressures without compressing excessively in the longitudinal direction: The resultant of the pressure tending to make the said lip bear against the central cylindrical piece.

The device operates in the following manner: When the pressure admitted through the pipe 15' exceeds a certain value, the lip 4 moves away from the central seat 18' and allows the surplus fluid to escape through a conduit 16'. When pressure diminishes, ceases or changes in direction, the elastic tension of the packing returns the lip 4 to its seat and closes the valve. Nor is any leakage possible due to the double seal provided by the internal lip 4 contacting the central piece 18' and the external lip 5 contacting the external body 7'. The actions of the two lips is cooperative because of the hinge at 6 and due to the compression of the toric bead 3.

Figure 10:
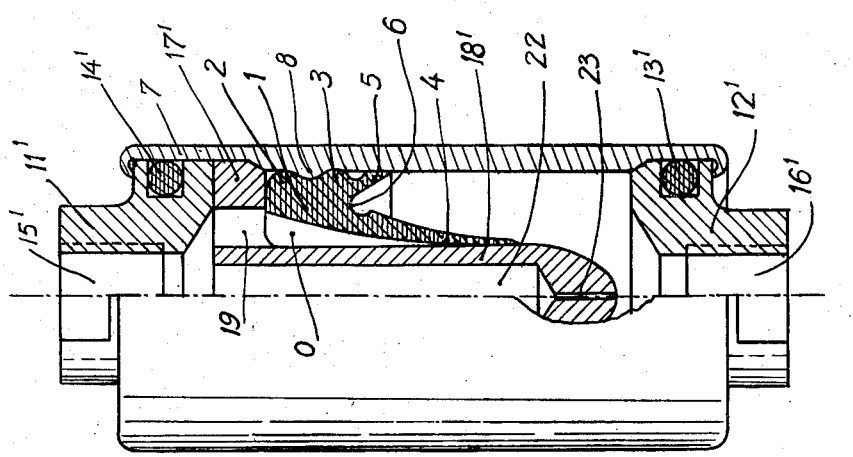
FIGURE 10 shows a view, half in longitudinal section, on the valve according to a second modified form of embodiment.

Referring now to FIGURE 10, it will be seen that the valve member is constituted by a flexible packing 1 made of rubber or an elastic plastic material, comprising a base formed of two beads 2 and 3 and, at its other end, two lips terminating in a bevelled or tapered marginal surface: A large internal lip 4 and a small external lip 5, the two lips are articulated on the circular groove 6 which forms a hinge and enables them to be movable relatively to one another and relatively to the base of the packing. An appropriate number of internal grooves, such as those illustrated at O in FIGURES 8 and 9, are also provided to allow the normal passage of the fluid.

The packing is held in the valve body 7 by the bead 8 of the body which fits between the two beads 2 and 3 of the packing. A free space has been left between the bead 3 and the lip 5 so as to facilitate the movement of the latter and to prevent reaction of the metallic bead 8 on the lip 5 when the latter is compressed in its longitudinal direction. Sleeves 11' and 12' formed with orifices 15' and 16' are also provided at the inlet and outlet ends of the valve, to which they are fixed by any appropriate means.

The fluid-tightness of this connection is ensured by the toric packings 13' and 14'.

The base of the packing bears against the small plate 17' which is arranged inside the body 7 and in which are formed, to allow the passage of the fluid, orifices 19 which must of course correspond to the grooves O of the packing, as explained above.

When the packing is placed in the body 7, the lip 4 is fitted on to the central cylindrical piece 18', on to which it is made to bear with a force proportional to its elastic tension. A duct 22 terminating in a calibrated orifice 23 is formed axially through this piece 18', which is situated concentric with the valve and centrally thereof.

This valve operates in the following manner: when the pressure admitted through the orifice 15' exceeds the pressure prevailing at the outlet 16', the fluid passes through the calibrated orifice 23 from the valve end 15' to the end 16'. When this pressure exceeds a certain value and the diameter of the orifice 23 is no longer sufficient to allow the fluid to escape sufficiently rapidly, the lip 4 moves away and allows the excess fluid to flow out through the orifice 16'. When the pressure diminishes, creases or changes direction, the elastic tension of the packing restores the lip 4 against its seat and closes the valve, which obturates the large cross-section of passage offered to the fluid in the direction 16'—15', only leaving the passage afforded by the calibrated orifice 23.

Figure 11:
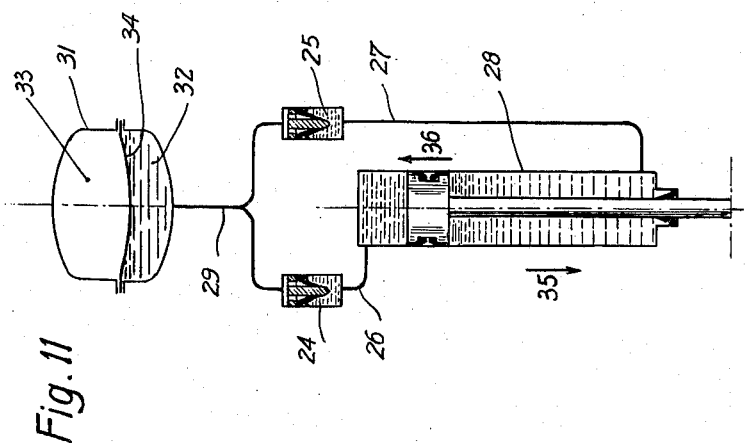
FIGURE 11 shows the arrangement of two of these valves according to FIGURE 10 in a case where they are used in a hydraulic-pneumatic suspension system.

FIGURE 11 illustrates the application of this device to the hydraulic-pneumatic suspension of a vehicle, 24 and 25 designating two valves according to the invention connected respectively, on the one hand, by the pipes 26 and 27 to the ends of a hydraulic shock-absorber 28 and, on the other hand, by way of the pipe 29 to a reservoir 31 which contains oil 32 and air 33 separated by an elastic diaphragm 34.

This device operates in the following manner:

When the piston of the shock-absorber is moved suddenly downardly in the direction of the arrow 35, its movement is braked by the calibrated orifice of the valve 25, while the valve 24 opens widely, permitting the oil held under pressure at 32 by the air 33 contained in the reservoir 31 to fill up at once the vacuum created in the shock-absorber by the downward movement of its piston, thus preventing the cavitations which are a source of shocks in the suspension system.

In the case of a shock in the reverse direction, acting on the piston in a direction of the arrow 36, the method of operating is similar: the upward movement of the piston is braked by the calibrated orifice of the valve 24, while the valve 25 opens to permit the free passage of the oil from the reservoir 31 towards the shock-absorber.

Examination of the operation and arrangement of this device shows that the calibrated orifices of the valves 24 and 25 can be given different cross-sections in order to vary the damping effect in one direction or the other according to need.

I claim:

1. A check valve comprising, in combination, a valve body having an inner wall surface defining a main fluid passageway extending therethrough and having inner wall surfaces defining a circumferential recessed area extending axially a limited extent and forming at least one shoulder radially of said main passageway, a coaxial core member extending axially of the body portion an extent greater than the extent of the recessed area and having a radially extending circumferential flange portion seated on said shoulder for removably mounting the core member spaced radially inwardly of the inner wall surfaces of the valve body portion, said flange portion being provided with apertures disposed radially of the core member to enable upstream fluid to flow about the core, an annular yieldable valve member having a sleeve body portion releasably disposed so as to seat on said flange portion and spaced radially of the core member and the apertures, said sleeve body portion having at least a part thereof fitting into said recessed area releasably to retain said sleeve body portion against axial movement, the valve member having an annular, wide tapered rim extending radially inwardly from the valve member body portion and in a direction axially of the core portion to engage the core member peripherally to form a fluid-tight seal between the peripheral marginal portion of the rim and the core member surfaces engaged, said valve member having an annular cut-out disposed at the root of the wide rim so that the valve member has a reduced cross section at an annular area of juncture between the rim and body portion for rendering the entire rim more responsive to deflection relative the valve member body portion, angularly spaced ribs extending radially and axially of the core member maintaining the sleeve portion under radial tension, said ribs extending axially along the core member a distance less than the distance said valve member extends axially of the core member, the peripheral marginal portion of the angular rim having a predetermined thickness to enable it to deflect radially in a direction away from the core member in response to a predetermined upstream fluid pressure effective in a direction corresponding to the direction toward which the rim extends axially thereby to open the valve and to deflect in a direction for engaging the core member peripherally when a higher pressure obtains downstream thereby to close the valve.

2. A check valve according to claim 1, in which the yieldable valve member comprises a second annular, tapered rim extending radially outwardly from the valve member body portion and disposed engaging the inner surfaces of the valve body defining said recessed area and with radially inwardly directed pressure applied thereto thereby to continuously bias the first-mentioned rim in a direction for engaging the core member with its peripheral marginal portion.

3. A check valve according to claim 1, in which the core member is provided with a calibrated orifice extending axially in the core member.

4. A check valve comprising a valve body having an inner wall surface defining a fluid passageway extending therethrough and a radial shoulder, a core member disposed in said passageway and extending coaxially thereof with an outer surface spaced radially inwardly of the inner surface of said valve body and defining therewith an annular passageway, said core member having near one end thereof a flange portion extending radially outwardly and seating on said shoulder, and an annular yieldable valve member of elastomeric material coaxially surrounding the said core member and comprising a sleeve portion seating on said flange portion and spaced radially outwardly of said core member to define an annular space therebetween, said flange having openings therethrough between said sleeve portion and said core member to permit flow of fluid through said annular space, said sleeve portion having on its outer surface at least two annular beads of arcuate cross section engaging the inner wall surface of said valve body and an annular recess of arcuate cross section between said beads, said valve body having on its inner surface a radially inwardly projecting annular rib fitting into said annular recess releasably to retain said sleeve body against axial movement and thereby retain said flange portion of said core member seated on said shoulder, said valve member further having a first annular wide tapered lip extending axially from said sleeve portion in a direction away from said flange and radially inwardly into resilient engagement with said core member and a second annular narrower tapered lip extending axially away from said sleeve portion in a direction away from said flange and radially outwardly to engage the inner surface of said valve body, said lips being angularly disposed relative to one another to define a V-shaped space between them, whereby pressure of fluid in said V-shaped space tends to force said first lip radially inwardly against said core member to provide a fluid-tight seal between the peripheral marginal portion of said lip and the core member surface engaged thereby and tends to force said second lip radially outwardly against the inner surface of said valve body to cooperate with said beads in providing a fluid-tight seal between the valve member and said valve body and retaining said valve member and core member in position in said valve body.

References Cited in the file of this patent

UNITED STATES PATENTS

| | | |
|---|---|---|
| 1,596,520 | Eskholme | Aug. 17, 1926 |
| 2,481,150 | Pifer | Sept. 6, 1949 |
| 2,572,308 | Brown | Oct. 23, 1951 |
| 2,576,810 | Ratelband | Nov. 27, 1951 |
| 2,621,889 | Annin | Dec. 16, 1952 |
| 2,645,087 | Neumann | July 14, 1953 |
| 2,646,063 | Hayes | July 21, 1953 |

FOREIGN PATENTS

| | | |
|---|---|---|
| 938,888 | Germany | Feb. 9, 1956 |